United States Patent [19]

Stringer

[11] 4,002,916
[45] Jan. 11, 1977

[54] APPARATUS FOR MEASURING A FLUX OF NEUTRONS

[75] Inventor: James L. Stringer, Richland, Wash.

[73] Assignee: The United States of America as represented by the United States Energy Research and Development Administration, Washington, D.C.

[22] Filed: June 26, 1975

[21] Appl. No.: 590,758

[52] U.S. Cl. ............................. 250/392; 250/390
[51] Int. Cl.² ........................................ G01T 3/00
[58] Field of Search .......... 250/390, 391, 392, 394, 250/358, 370, 371

[56] References Cited

UNITED STATES PATENTS

| | | | |
|---|---|---|---|
| 3,137,792 | 6/1964 | Staples et al. | 250/392 |
| 3,400,289 | 9/1968 | Anderson | 250/390 |
| 3,688,118 | 8/1972 | Martina | 250/390 |
| 3,731,100 | 5/1973 | Lattin | 250/394 |
| 3,873,840 | 3/1975 | Ellis | 250/392 |
| 3,904,881 | 9/1975 | Klar et al. | 250/390 |

Primary Examiner—Archie R. Borchelt
Attorney, Agent, or Firm—Dean E. Carlson; Arthur A. Churm; Donald P. Reynolds

[57] ABSTRACT

A flux of neutrons is measured by disposing a detector in the flux and applying electronic correlation techniques to discriminate between the electrical signals generated by the neutron detector and the unwanted interfering electrical signals generated by the incidence of a neutron flux upon the cables connecting the detector to the electronic measuring equipment at a remote location.

3 Claims, 5 Drawing Figures

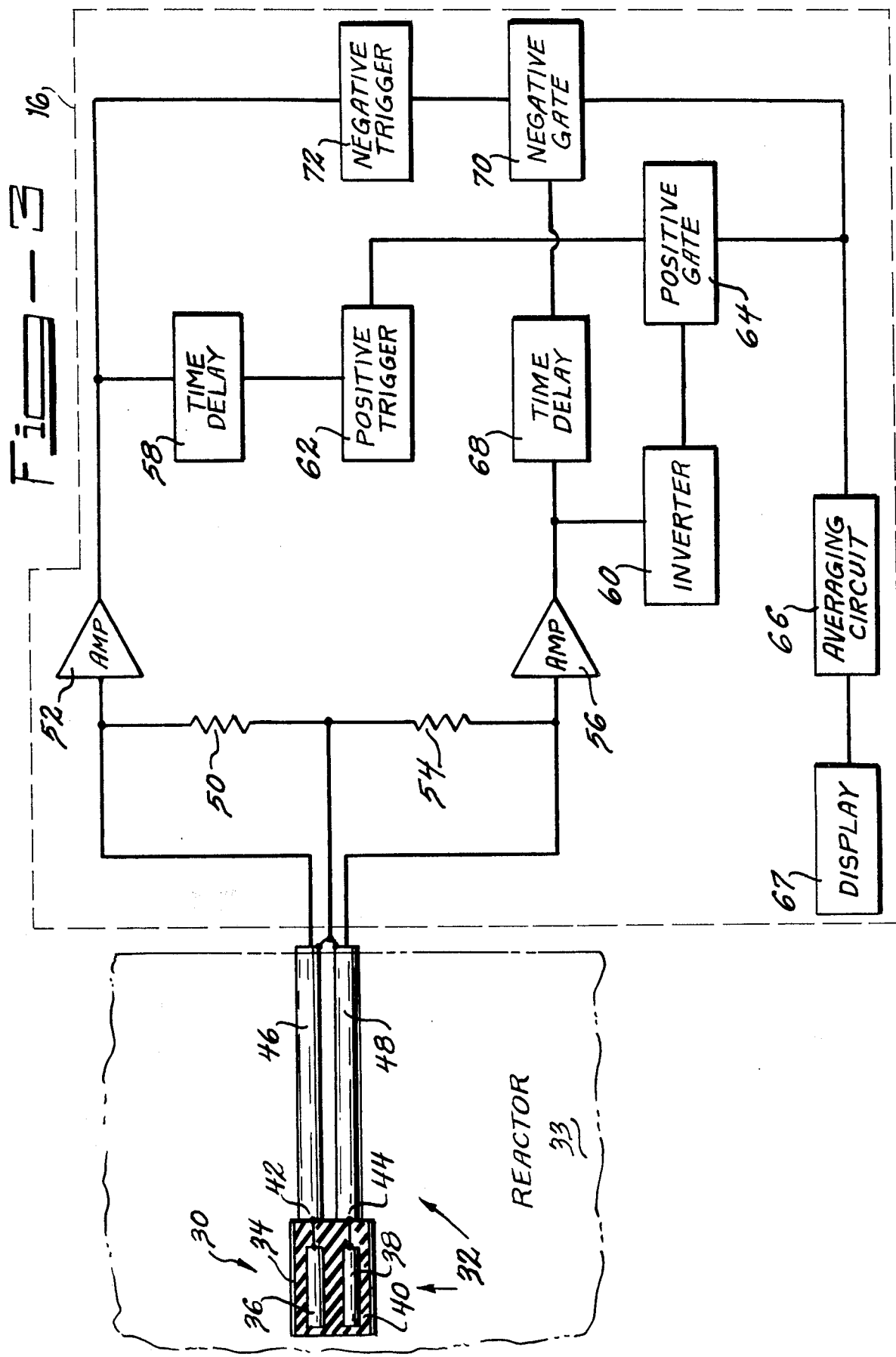

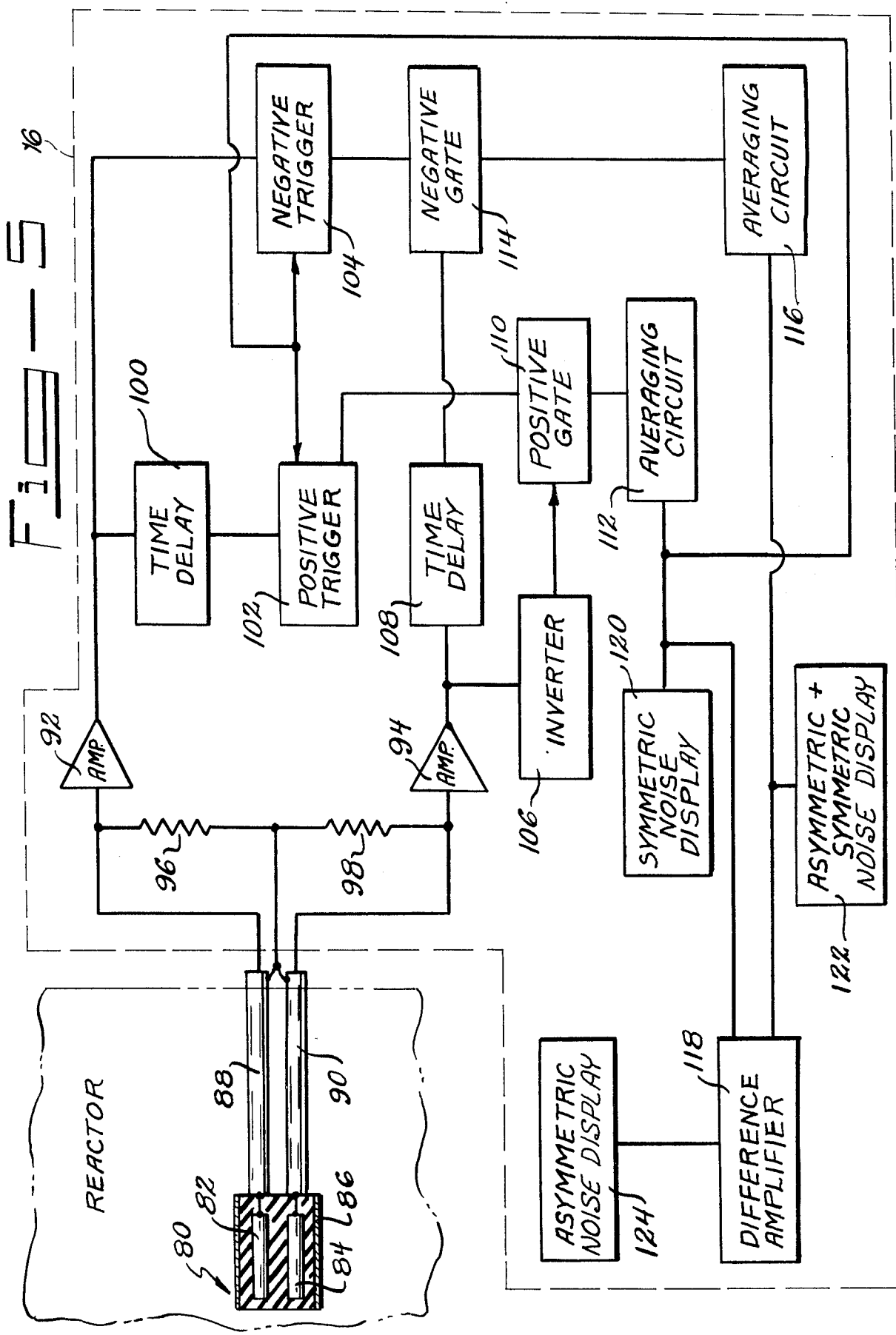

APPARATUS FOR MEASURING A FLUX OF NEUTRONS

CONTRACTUAL ORIGIN OF THE INVENTION

The invention described herein was made in the course of, or under, a contract with the U.S. ENERGY RESEARCH AND DEVELOPMENT ADMINISTRATION.

BACKGROUND OF THE INVENTION

This invention relates to the measurement of a flux of neutrons at a desired location such as the interior of a nuclear reactor.

The monitoring and control of a nuclear reactor requires a knowledge of the neutron flux at particular locations in the interior of a nuclear reactor. It is necessary to cause the uncharged neutrons to impinge upon some type of device which generates from their flux a signal which is either an electrical signal or which is convertible into an electrical signal for remote amplification and detection. Various types of detectors such as ionization chambers have been used in the past to generate electrical signals from ion fluxes. Of particular utility is a solid-state detection device made of a ceramic such as magnesium oxide or aluminum oxide. The ceramic may be in either solid or powdered form. A flux of neutrons incident on such a ceramic will generate charged particles and gamma rays as a result of the collisions of neutrons with the atoms of the ceramic. By selection of the materials of the ceramic it is possible to effect desired forms of discrimination against unwanted energy ranges in the neutron flux. However, the price that is paid for this advantage is the extremely low level of the signal that is generated by the incidence of a particular neutron on the ceramic. Because this signal occurs at a low level, it is necessary to take steps to insure that the signal not be lost in any electrical noise that is generated elsewhere in the system.

A further problem arises from the fact that the information about the neutron flux at a particular location in a reactor must be transmitted to a remote location to be of any use. This means that some form of electrical cabling is used to connect from the location of the detector within the reactor to the electrical logical and processing apparatus located outside the reactor. Typically at least a portion of the cable connecting these two will be exposed to a portion of the neutron flux existing in the interior of the reactor. This flux will generate signals in the cable which comprise an interfering electrical noise component that tends to mask the desired signals generated by neutrons incident upon the detector. This problem is compounded by the fact that the flux of neutrons is a random process obeying statistical laws and can therefore be separated from interfering signals only by the use of statistical techniques.

It is an object of the present invention to provide a better means of detecting a flux of neutrons.

It is a further object of the present invention to facilitate the use of solid-state neutron detectors for detecting a flux of neutrons.

It is a further object of the present invention to provide a means of separating the electrical signals resulting from the incidence of a flux of neutrons on a detector from the interfering electrical noise resulting from the incidence of neutrons on the cables connecting the neutron detector to external electrical signal processing equipment.

Other objects will become apparent in the course of a detailed description of the invention.

SUMMARY OF THE INVENTION

A flux of neutrons at a desired location is measured by placing a solid state detector at the desired location, connecting the detector to a remote measuring point by electrical cables, and applying statistical correlation techniques at the remote location to discriminate between the signals generated by incidence of neutrons on the detector and the unwanted electrical noise signals generated by neutrons incident upon the cable.

BRIEF DESCRIPTION OF THE DRAWINGS

FIG. 3 is a view of an alternate embodiment of a neutron detector connected by coaxial cable to an embodiment of a signal-processing circuit.

FIG. 5 is a combined sketch and schematic showing a detector connected by coaxial cables to an asymmetric noise measuring circuit.

DETAILED DESCRIPTION OF THE INVENTION

Figure 1:
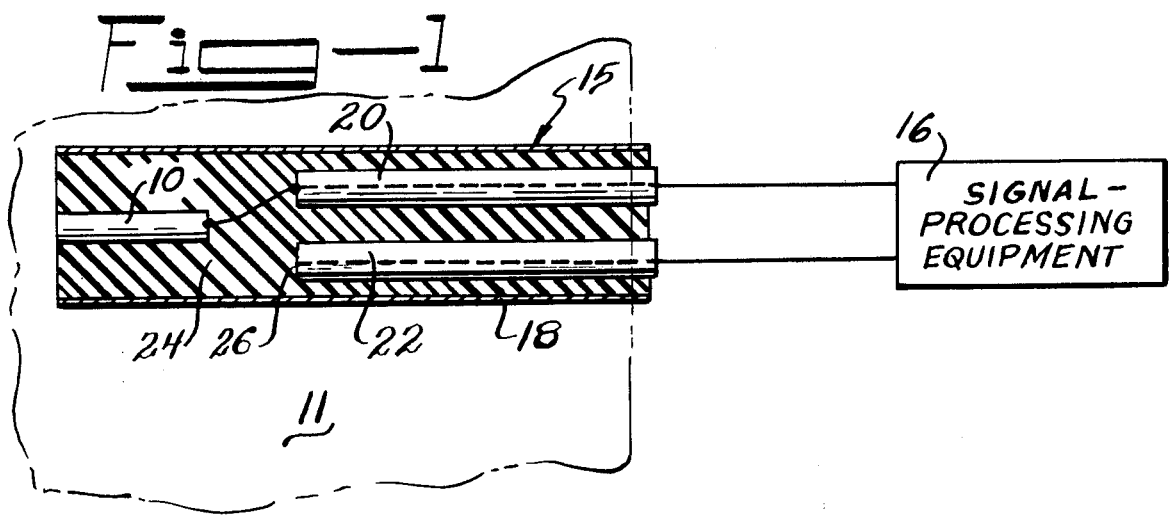
FIG. 1 is a sketch showing a detector in place in a nuclear reactor with shielded cabling coupling electrical signals to signal-processing equipment.
Figure 2:
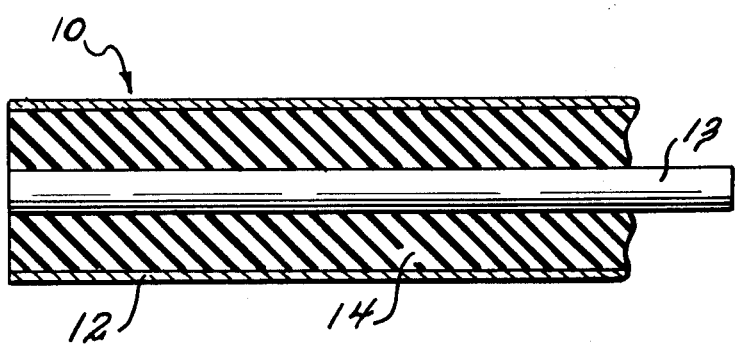
FIG. 2 is an expanded partial sectional side view of the detector of FIG. 1.

FIGS. 1 and 2 show a detector in place in a nuclear reactor and connected by cable to signal-processing equipment. FIG. 1 is an overall view showing a detector and the cables with their connection to signal-processing equipment, and FIG. 2 is an expanded partial sectional view of the detector. In FIGS. 1 and 2, detector 10 is a solid-state detector of neutrons that is located in the interior of a nuclear reactor 11. Outer shield 12 is an electrical conductor disposed coaxially about inner element 13. Insulator 14 provides electrical insulation between outer shield 12 and inner element 13 and also generates an electrical signal between outer shield 12 and inner element 13 in response to the incidence of a neutron on insulator 14. Cable 15 is connected to detector 10 and to signal-processing equipment 16 with a portion of cable 15 being inside nuclear reactor 11 and thus exposed to a neutron flux that, in general, is different from the flux incident upon detector 10. Neutrons incident on cable 15 will generate electrical signals in cable 15 which must be distinguished by some means from the signals produced by neutrons incident on detector 10 if the signals thereby generated in detector 10 are to be of maximum utility. The scheme for discrimination is as follows. Cable 15 is a twinaxial cable in which an outer shield 18 encloses a first conductor 20 and a second conductor 22, all insulated from one another by insulation 24. It can be seen from FIGS. 1 and 2 that first conductor 20 is connected to detector 10 and that second conductor 22 makes no connection at its end 26 that is closer to detector 10. Second conductor 22, however, is in close proximity to first conductor 20 and is therefore exposed to essentially the same neutron flux as first conductor 20. Accordingly, the two conductors 20 and 22 will carry electrical signals that permit separation as follows. First conductor 20 carries electrical signals resulting from neutrons incident on detector 10 and also from neutrons incident on first conductor 20. Second conductor 22 will contain electrical signals resulting only from neutrons incident upon second conductor 22. In principle, subtraction of the electrical signal in second conductor 22 from that in first conductor 20 will remove from the signal in first conductor 20 the unwanted electrical noise that results from the incidence thereon of neutrons striking cable 15. If, therefore, signal-processing equipment 16 processes this signal by performing the subtraction and providing a response proportional to the rms value of the difference voltage than this signal will provide a measure of the neutron flux incident on detector 10. In the case of a detector 10 that produces an electrical signal sufficiently great in magnitude that the only noise problem of concern is that generated by neutron incident on cable 15 then the combination of a difference amplifier and an rms voltmeter will suffice to serve as signal-processing equipment 16. Typically, however, detector 10 produces a small enough signal that more sophisticated methods must be used to sort the signal associated with neutron flux incident upon detector 10 from noise generated elsewhere in the circuit. In this case, the refinements described below will aid in performing the separation.

Figure 4:
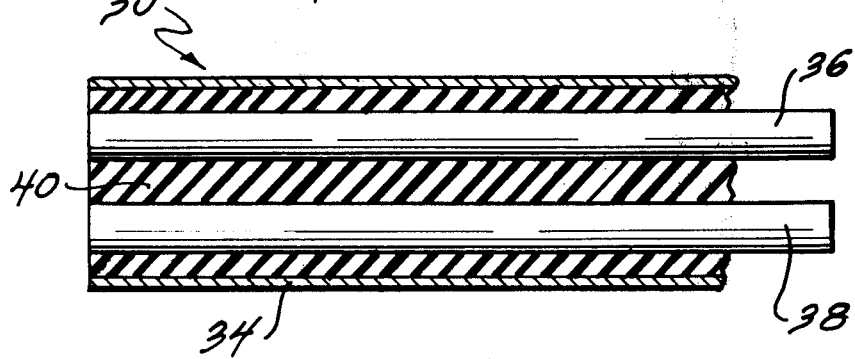
FIG. 4 is an expanded partial sectional side view of the detector of FIG. 3.

FIGS. 3 and 4 show an alternate embodiment of the present invention. FIG. 3 is a combined sectional view and symbolic electrical diagram of a detector, a signal-processing circuit and the cables connecting them. FIG. 4 is an expanded partial sectional side view of the detector of FIG. 3. In FIG. 3 detector 30 is disposed in a flux 32 of neutrons typical of that of be found in the interior of a nuclear reactor 33. Referring to FIG. 4, detector 30 can be seen to comprise an outer shield 34 of electrically conducting material enclosing a first conductor 36 and second conductor 38. First conductor 36 and second conductor 38 are insulated from each other and from outer shield 34 by insulator 40, which also serves to generate an electrical signal between first conductor 36 and second conductor 38 in response to the incidence of a neutron on insulator 40. Referring again to FIG. 3, first conductor 36 and second conductor 38 of detector 30 are seen to be connected respectively to the center conductors 42 and 44 of coaxial cables 46 and 48. Center conductors 42 and 44 provide a balanced output which is processed as follows. Center conductor 42 is connected across first resistor 50 to the input to amplifier 52. Center conductor 44 is connected across second resistor 54 and also to the input to amplifier 56. Consider first the case when a positive voltage appears across first resistor 50 and at the input to amplifier 52. Because of the balanced circuit, a negative voltage then appears across second resistor 54 at the input to amplifier 56. If the voltage at the output of amplifier 52 exceeds a positive preset trigger threshold, a signal is conducted through time delay 58 to positive trigger 62. During this time, the negative voltage across second resistor 54 has been amplified by amplifier 56 and inverted in polarity by inverter 60. The time delay 58 following amplifier 52 is adjusted so that the positive voltage from inverter 60 is at the input of positive gate 64 at the time that positive gate 64 is enabled by the signal from positive trigger 62. The positive gate 64 remains open only as a long as the voltage from amplifier 52 exceeds the previously selected threshold level. During this time the voltage from inverter 60 is added in averaging circuit 66 for display on display 67. The symmetry of the coaxial cables 46 and 48 causes essentially complete cancellation of the electrical noise generated by neutrons incident on both cables and the result is that the portion of the circuit thus far described produces a contribution to the signal input to averaging circuit 66 that is a function of the incident neutron flux on detector 30 in a direction that causes a positive input signal across first resistor 50 and into amplifier 52.

Consider now the opposite situation in which a neutron incident on detector 30 causes a positive signal across second resistor 54 and at the input to amplifier 56. At the same time a negative voltage of the same magnitude appears at the input to amplifier 52. If the voltage at the output of amplifier 52 exceeds the peset negative trigger threshold, negative gate 70 is opened for signal passage. During this time the positive voltage at the input to amplifier 56 has been amplified by amplifier 56 and the signal is conducted through time delay 68 to negative gate 70. Time delay 68 following amplifier 56 is adjusted so that the positive voltage from amplifier 56 is applied to negative gate 70 in coincidence with the output of negative trigger 72. Negative gate 70 remains open as long as the voltage from amplifier 52 exceeds the threshold level of negative trigger 72. During this time the voltage from amplifier 56 is added to the averaging circuit. The threshold levels for triggering are set to provide a first-order rejection to cable noise when they are set above the three-sigma level for cable noise alone.

FIG. 5 is a combined sketch and schematic diagram showing a detector connected by coaxial cables to an asymmetric noise measuring circuit. In FIG. 5 detector 80 comprises conductors 82 and 84 encased in a housing 8. Conductor 82 is coated with a material that absorbs neutrons readily and that displays a small residual induced activity while conductor 84 is not so coated. Examples of such materials include isotopes of boron, lithium, and europium. Conductors 82 and 84 are connected respectively by coaxial cables 88 and 90 to amplifiers 92 and 94 respectively. Resistors 96 and 98 are connected between the respective inputs to these amplifiers and a common terminal. The signals at the inputs to amplifiers 92 and 94 can be divided conceptually into two parts. One part is the noise generated by all parts in the detector system other than the neutron absorbing coating. This portion of the signal will be the same at each amplifier input and will be correlated. The other portion of the signal, that associated with the neutron-absorbing coating that is applied to detector 82, will not be symmetrical with the signal caused by neutrons incident on conductor 84. As a result, the noise generated by the neutron sensitive coating will result in a current which has only one polarity. The objective of the balance of the circuit in FIG. 5 is to obtain a relative measure of the asymmetric noise generated by the incidence of neutrons on conductor 82. To accomplish this the amplified output signal from amplifier 92 is applied through a time delay 100 to a positive trigger 102. The same output is also applied to a negative trigger 104. At the same time the output of amplifier 94 is applied to an inverter 106 and a time delay 108. The inverter output from inverter 106 is applied simultaneously with the output of positive trigger 102 to positive gate 110. When positive gate 110 opens, an output is applied to averaging circuit 112. The output of averaging circuit 112 is used to set the threshold valves for positive trigger 102 and negative trigger 104. This output is a measure of the symmetric noise detected by the combination of the detector and the cables that are exposed to the flux in the measuring system. The output of negative trigger 104 is applied together with the output of time delay 108 to negative gate 114. The output of negative gate 114 is applied to averaging gate 116 which produces an output that includes the asymmetric noise plus the symmetric noise. The outputs of averaging circuit 112 and averaging circuit 116 are connected to difference amplifier 118 which obtains the difference therebetween.

Three displays are useful for bringing out the data developed by the circuit of FIG. 5. Symmetric noise display 120 is connected to the output of averaging circuit 112 to provide a measure of symmetric noise. Asymmetric plus symmetric noise display 122 is connected to the output of averaging circuit 116 to provide a measure of the statistical sum of asymmetric noise and symmetric noise. Neutron flux display 124 is connected to the output of difference amplifier 118 to respond to the difference signal, the asymmetric noise, hence to the neutron flux at the location of detector 82. The effects of neutrons incident on coaxial cables 88 and 90 and on conductor 84 have been subtracted from this measurement by operation of the electronic circuit just described. The displays 120, 122, and 124 may be meters, oscilloscopes, or the like.

The apparatus described above serves to reduce or eliminate the unwanted effects of connecting cables on the output signals from detectors of neutron fluxes. The detector system thus disclosed also has a time response that is short compared to other sensitive neutron detectors that operate by detecting emitted beta rays. Heat generation in the detector is not a problem since the detector is solid state which afford better heat transfer for cooling then the devices which depend upon vacuum elements. In addition, the temperatures of the detectors and cables is of minor importance since detector noise that is a function of temperature is symmetrical in the cable system.

The embodiments of the invention in which an exclusive property or privilege is claimed are defined as follows:

1. An apparatus for determining the magnitude of a flux of neutrons at a measuring location which location is surrounded by an unwanted flux of neutrons generating noise, the system comprising:
    a first conductor disposed at the measuring location and connected electrically through a first coaxial cable to a remote location;
    a second conductor disposed in physical proximity to said first conductor but insulated electrically therefrom, said conductor connected by a second coaxial cable paralleling said first coaxial cable to said measuring location;
    a first amplifier connected to the first coaxial cable and responsive to electrical signals therein to generate a first amplifier signal;
    a second amplifier connected electrically to the second coaxial cable and responsive thereto to generate a second amplified signal;
    a negative trigger connected electrically to the output of the first amplifier to generate therefrom a negative trigger signal;
    a first time delay connected to the output of the first amplifier to generate therefrom a delayed first amplifier signal;
    a positive trigger connected to the first time delay and responsive thereto to generate a positive trigger signal;
    an inverter connected to the output of said second amplifier to generate therefrom an inverted second amplifier signal;
    a positive gate connected electrically to the positive trigger and to the inverter to generate therefrom a positive gate signal upon coincidence of a positive trigger signal and an inverted second amplifier signal;
    a second time delay connected to the output of the second amplifier to generate a delayed second amplifier signal;
    a negative gate connected electrically to the negative trigger and to the second time delay to generate therefrom a negative gate signal upon coincidence of a negative trigger signal and a time delayed second amplifier signal;
    averaging means connected to the positive gate and the negative gate and responsive to the positive gate signal and the positive gate signal to generate averaged signals therefrom; and
    display means for displaying the averaged signals, which displayed signal is proportional to the statistically correlated portions of the inputs to the first and second amplifiers and hence to the neutron flux at the remote location.

2. The apparatus of claim 1 wherein the averaging means comprise an averaging circuit connected to the positive gate and the negative gate and response to the positive gate signal and the negative gate signal to generate therefrom an output signal that is proportional to their average; and wherein the display means comprise a meter responsive to the output signal.

3. The apparatus of claim 1 wherein the first conductor is coated with a neutron-absorbing material and wherein the averaging means comprise a first averaging circuit connected to the positive gate and responsive to the positive gate signal to generate an average positive gate signal;
    a second averaging circuit connected to the negative gate and responsive to the negative gate signal to generate therefrom an averaged negative gate signal;
    a difference amplifier connected to the first and second averaging circuits and responsive to the averaged positive and negative gate signals to generate therefrom a difference signal;
    an electrical connection from the first averaging circuit to the positive trigger and the negative trigger to set threshold values for the positive and negative triggers with the averaged positive gate signal;
    further wherein the display means comprise a first visual displayer connected to the first averaging circuit and responsive to the averaged positive gate signal to generate a first display that is proportional to symmetric noise;
    a second visual displayer connected to the second averaging circuit and responsive to the averaged negative gate signal to generate a second display that is proportional to the statistical sum of asymmetric and symmetric noise; and
    a third visual displayer connected to the difference amplifier and responsive to the difference signal to generate a third display that is proportional to asymmetric noise and hence to the flux of neutrons at the measuring location.

* * * * *